J. M. IRVINE.
EGG TESTER.
APPLICATION FILED JULY 22, 1912.
1,106,348.
Patented Aug. 4, 1914.
2 SHEETS—SHEET 2.
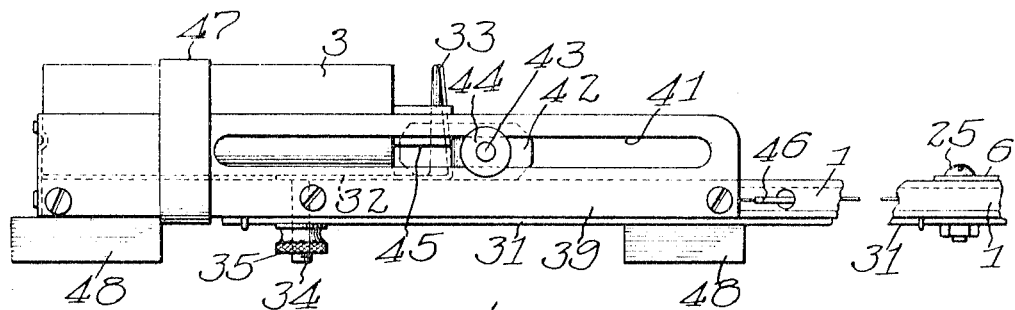
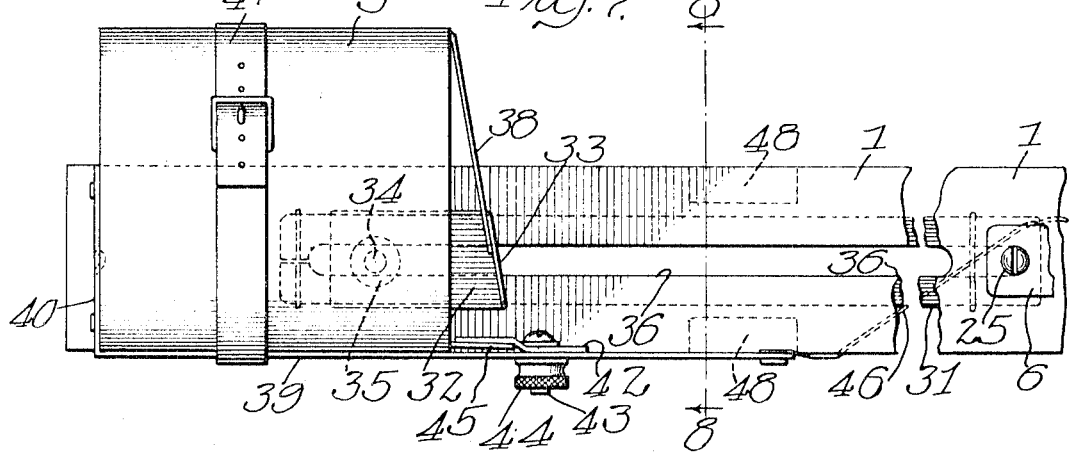
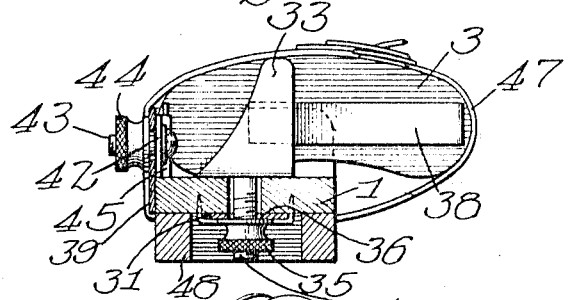
Witnesses:
Inventor:
John M. Irvine
By Hill & Hill
Attys

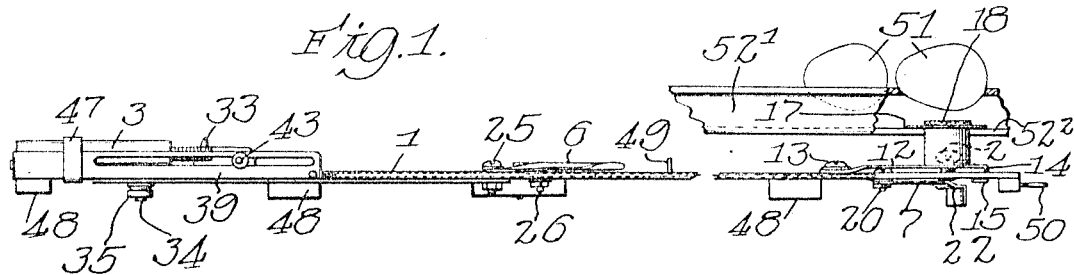
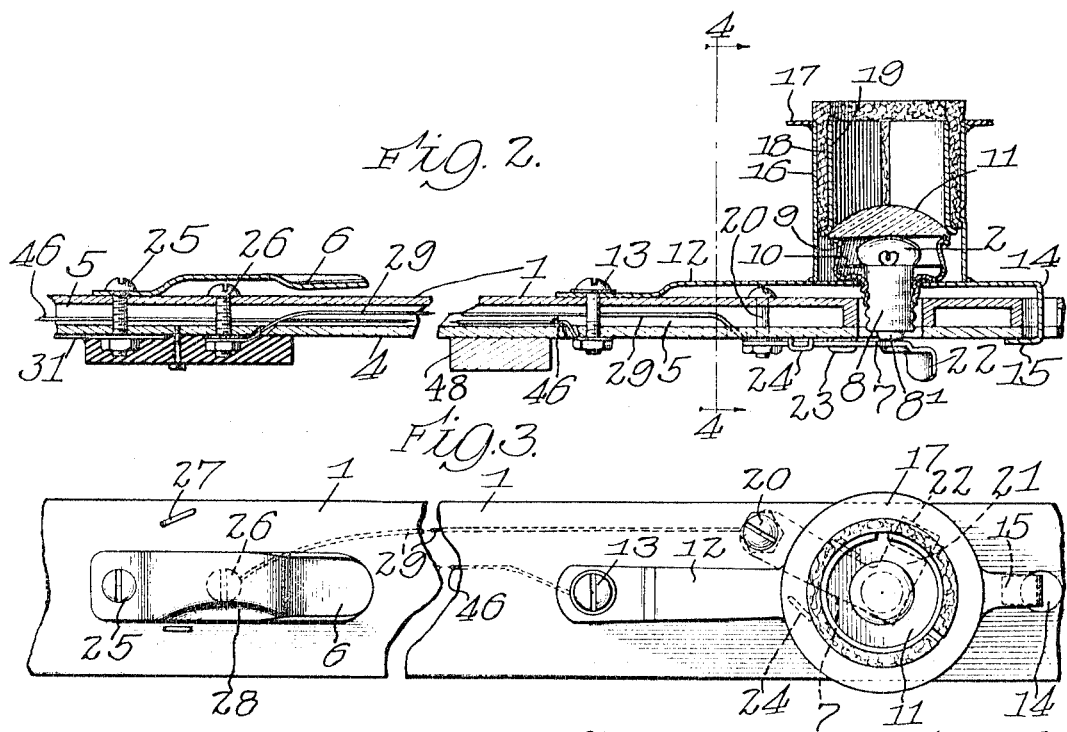
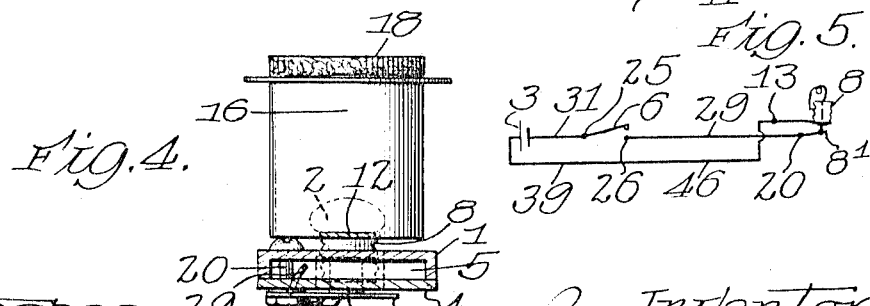

UNITED STATES PATENT OFFICE.

JOHN M. IRVINE, OF WILLIAMS BAY, WISCONSIN.

EGG-TESTER.

1,106,348.      Specification of Letters Patent.      Patented Aug. 4, 1914.

Application filed July 22, 1912. Serial No. 710,866.

*To all whom it may concern:*

Be it known that I, JOHN M. IRVINE, a subject of the King of England, residing at Williams Bay, in the county of Walworth and State of Wisconsin, have invented certain new and useful Improvements in Egg-Testers, of which the following is a description.

My invention belongs to that general class of devices known as egg testers, and relates particularly to a tester for testing eggs in incubators, its use, however, not being confined to that alone, as it may be used on farms, in grocery stores, egg stores, and the like, for what is known as candling eggs for the market, and in any other ways that it may be found useful or convenient.

In testing eggs in incubators, the usual way is to remove the tray of eggs, and in reality, candle the same to determine whether or not the eggs are suitable for hatching. Owing to the time required for this, it has been the custom with incubator care-takers to throw a blanket over the tray to keep the eggs warm during the testing, because if the eggs become cold or chilled, they are without value for the purpose indicated. With the use of my tester the eggs may be rapidly tested whether the tray is removed or left in the incubator, without danger of the eggs in any way becoming chilled.

My invention has among its objects the production of a device of the kind described that is simple, compact, convenient, efficient, durable and satisfactory, that is economical in operation, and particularly adapted for rapid work.

To this end my invention consists in the novel construction, arrangement and combination of parts herein shown and described, and more particularly pointed out in the claims.

In the drawings, wherein like reference characters indicate like corresponding parts, Figure 1 is a side elevation of my improved tester. Fig. 2 is a sectional view of a portion of the same, Fig. 3 is a top elevation of the same portion. Fig. 4 is a sectional view taken substantially on line 4—4 of Fig. 2. Fig. 5 is a diagrammatic view, showing a simple way of wiring the tester where an electric light is employed. Fig. 6 is a side elevation of a portion of the device not shown in Fig. 2, Fig. 7 is a top elevation of the same, Fig. 8 is a sectional view substantially on line 8—8 of Fig. 7, and Fig. 9 is a perspective view of the switch member 6.

Referring to the drawings, 1 represents a suitable base, preferably of considerable length as compared with its other dimensions. At one end is arranged an electric lamp 2, and at the opposite end a battery 3. Where the source of energy is derived from other than a battery, the battery may be omitted, and a suitable connection for the source of energy arranged in its place. One end of the body part 1 is preferably chambered, as at 5, and the lower or open side covered by a bottom 4, so that electric wires may be arranged within the chamber. The preferred form of my device is provided with two electric switches 6 and 7, the same forming controlling means for the light, so that the same may be controlled in a plurality of ways, as hereafter described. The light 2 is provided with the usual screw end or plug 8, and a contact 8', the two being suitably connected to the conductors of the lamp. The lamp itself is therefore substantially similar to those already on the market. The lamp shown is arranged to screw into a shell 9 secured to the yielding or resilient part 12. Above the lamp and supported by the shell 9 may be provided a lens 11, 10 being a suitable reflector, which may also be provided.

The resilient lamp support 12 is secured to the device by a bolt 13, which also serves as a binding post. Any equivalent may be employed for the purpose. The opposite end of the resilient or yielding part 12 may be bent as at 14, 15, and extended through an opening in the part 1, the purpose of the bent portion being to limit the movement of the resilient part 12. It may be mentioned that the part 12 forms substantially one part of the switch at the lamp end of the device, of which the part 7 is also a part. The light 2 and shell 9 is inclosed by a casing 16, preferably flanged at the top, as at 17. Within the casing 16 is arranged a pad 18 of felt or equivalent material, which is retained in position by resilient ring 19, which ring also maintains the lens 11 on the inner shell 9.

The switch 7 is pivoted to the body part by a screw or bolt 20, or the equivalent, which also acts as a binding post, and the part 7 is preferably extended as at 21, and slightly offset as at 22. When the switch is in the position shown, in contact with the stop 23, there is contact between the parts 7 and the contact 8', the switch being normally closed when the parts are in these positions. When, however, the switch 7 is moved against the stop 24, the offset part 22 is below the end 8' so that the circuit is normally open at this point, and is closed by depressing the resilient member 12, until the parts come into electrical contact. It will thus be noted that if an egg is placed on the top of the felt ring 18, it will close the circuit between 8' and 22, or if the device is raised against an egg suitably supported, as for example, the egg 51 supported by the rack 52 shown in Fig. 1, it will close the circuit and light the lamp.

The switch member 6 is preferably pivotally secured to the body-part, or base piece, by a bolt 25, or its equivalent, which also serves as a binding post. The switch member 6 is formed substantially as shown in Fig. 9, with an extended part 28, which may contact with a contact member or binding post 26. When the switch is in the position shown in Figs. 1, 2, and 3, however, it is normally out of contact with the contact member 26, and the circuit is closed by depressing the same. When, however, the switch is thrown against the stop 27, the part 28 rests upon the contact member, so that the circuit is closed. In using the device, when the switch 6 is in the position shown in the drawings, I preferably have the switch 7 in the position shown, so that the light is controlled by depressing the switch 6 as desired. When, however, the switch 7 is in the reverse position, I preferably move the switch 6 so that it is against the stop 27, with the part 28 resting upon the contact member 26. The contact member 26 is connected by a conductor 29, or its equivalent, to the binding post 20, and the binding post 13 is connected by a conductor 46 to a suitable source of energy. It is of course understood that the switches shown may be modified as desired, these shown however, being very simple and satisfactory for the purpose.

As I have mentioned, any source of energy may be provided, as for example, the device may be adapted to be connected with the usual electric lighting circuits. In the form shown, however, in the drawings, I have shown a battery 3 for the purpose, and suitable means for connecting the conducting wires of the circuits with almost any of the forms of batteries now on the market. The battery shown is provided with a contact at the side and end, but some, however, are arranged with contacts at both ends, and in various other ways. Referring particularly to Figs. 1, 6, 7 and 8, a plate 31 having a slot 36 up the center, is arranged upon one side of the base support 1, as shown, on the bottom, the plate being electrically connected with the binding post 25, which secures the switch 6 to the device. Arranged along the side of the device is a plate 39, which is extended over the end as at 40, the same being provided with a slot 41, (see Fig. 6). The battery 3 which is secured upon the support 1 by a strap 47, or any equivalent for the purpose, is provided with a contact 38, and contact 45 connected to or forming the two poles of the battery. Arranged to coöperate with the contact 38 is a member 32, preferably bent up as at 33, the same being slidably secured to the part 1 by a bolt 34 and thumb-nut 35. A contact member 42 is arranged on a plate 41, the same being secured thereto by a bolt 43 and thumb-nut 44. The plate 39 is connected by a conductor 46 to the binding post 13.

The base or support 1 is also preferably provided with blocks 48 arranged on the bottom side, so that the same may be supported upon a table or the like substantially in the position shown in Fig. 1, and with eyes 49 and 50 or the equivalent, for hanging the same up. The eyes 49 and 50, or either of them, may be arranged wherever desired. It may be mentioned that I preferably place the switch 6 at such a point upon the base 1 that the device will practically balance when held substantially at that point. In Fig. 1, I show several eggs 51, which, it may be assumed, are arranged in an incubator, and suitably supported by a tray 52' having holes therethrough.

In using the device, assuming that 52' is an incubator tray carrying eggs 51, the tester is inserted under the incubator tray and bought under each egg successively, as illustrated in Fig. 1, the felt 18 preventing the escape of any light from the casing 16, except that which passes through the egg. If the switches are arranged as shown in the drawings, the light is controlled by depressing the switch 6 as the device is brought under each egg. A circuit is formed from the battery through 31, 25, 6, 26, 29, 20, 7, 8', through the lamp, 8, 13, 46, 39, and thence to the opposite side of the battery, 31 and 39 being electrically connected with the battery, as previously described. The operation is the same where the conductors are attached to the usual lighting circuit. If the switch 6 is thrown so that it is in continual contact at 28 with the contact member 26, and the switch 7 is thrown so that contact is normally broken between 8' and 22, the device is operated by bringing the same under the egg and slightly raising it until it contacts with the egg. The pressure of the egg against the felt pad 18 will force the resilient member 12, so that it contacts with the end of the switch 7, forming a circuit, as previously described. It will be noted from the above that the device may therefore be controlled in a plurality of ways.

Where the device is used for candling eggs in stores and the like, it may be laid upon a suitable support or hung up and the eggs placed before the light, the circuits being made and broken in either of the ways described. It is, of course, understood that where the light or lamp is supplied with current from the ordinary lighting circuits, the switches 6 and 7 may both be maintained closed whenever desired so that the light burns continually. Where, however, a lamp and battery of the types shown are employed, it is more economical to arrange the device so that the light may be flashed as required, and as illustrated and described. When not in use the tester may be hung from the eyes 49 or 50, or their equivalents. While an electric light need not necessarily be employed for this, I prefer this form of light, since there is less danger from fire, and it is one of the most easily controlled. When the tester is used with an incubator it is unnecessary to remove the eggs from the egg trays of the incubator, and the testing may be done so rapidly that there is no opportunity for the eggs to become chilled, owing to the extremely convenient form of the device and its compactness. The incubator may be constructed so that the tester can be inserted in the incubator without removing the trays for testing. I have not, however, considered it necessary to illustrate my preferred form of incubator to show this. When it is used as an ordinary egg candler, the operator may have both hands free for handling the eggs, since he does not have to manipulate the light except by placing the eggs over the same and slightly pressing down with the egg upon the felt above the light.

Having thus described my invention, it is obvious that various immaterial modifications may be made in the same without departing from the spirit of my invention, hence I do not wish to be understood as limiting myself to the exact form, construction, arrangement or combination of parts herein shown and described, or uses mentioned.

What I claim as new and desire to secure by Letters Patent is:

1. In an egg tester and in combination, a suitable base provided at one end with a lamp, and at the opposite end with means for attachment to a suitable source of energy, and means for yieldingly carrying said lamp, and connecting the same with the said source of energy.

2. In an egg tester and in combination, a suitable base part provided with a lamp at one end yieldingly mounted thereon, a switch arranged proximate said lamp and arranged to coöperate therewith, and means for connecting said lamp and switch with a suitable source of energy.

3. In an egg tester and in combination, a suitable handle, provided with a battery at one end and an adjustably supported lamp at the opposite end, a normally open electric circuit connecting said battery and lamp, said lamp being arranged to close the said circuit when the lamp is depressed.

4. In an egg tester and in combination, a suitable handle, provided with a battery at one end and a resiliently supported lamp at the opposite end, a normally open electric circuit connecting said battery and lamp said lamp being arranged to close the said circuit when the lamp is depressed.

5. In an egg tester and in combination, a suitable handle, a battery arranged at one end of said handle, a pair of contact members arranged at said end for connection with the battery, a lamp arranged at the opposite end of said handle, an electric switch comprising a plurality of parts at said end, said lamp being mounted upon one of said switch parts and arranged to coöperate with the other switch part, and means for electrically connecting said switch parts with said contact members.

6. In an egg tester and in combination, a suitable handle, a battery arranged at one end of said handle, a pair of adjustable contact members arranged at said end for connection with the battery, a lamp arranged at the opposite end of said handle, an electric switch comprising a plurality of parts arranged at said end, said lamp being mounted upon one of said switch parts and arranged to coöperate with the other of said switch parts, conductors secured to said switch parts and to said contact members and a switch arranged between said first mentioned switch parts and said contact members.

7. In an egg tester and in combination, a suitable handle, a source of energy arranged at one end of said handle, a lamp, a casing arranged about said lamp and electrically connected thereto, a pad at the open end of said casing, said lamp extending through the opposite end of said casing, an adjustable support for said casing arranged at the opposite end of said handle, a coöperating contact member for said lamp, and means for electrically connecting said source of energy with said adjustable casing support and said contact member.

In testimony whereof, I have hereunto signed my name in the presence of two subscribing witnesses.

JOHN M. IRVINE.

Witnesses:
 FREDERICK SLOCUM,
 FRED MICHEL.